(12) United States Patent
Sugihara (10) Patent No.: US 12,065,961 B2
(45) Date of Patent: Aug. 20, 2024

(54) V-TYPE ENGINE AND WORK MACHINE

(71) Applicant: HONDA MOTOR CO., LTD., Tokyo (JP)

(72) Inventor: Atsuki Sugihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/549,529

(22) PCT Filed: Mar. 10, 2021

(86) PCT No.: PCT/JP2021/009505
§ 371 (c)(1),
(2) Date: Sep. 7, 2023

(87) PCT Pub. No.: WO2022/190252
PCT Pub. Date: Sep. 15, 2022

(65) Prior Publication Data
US 2024/0141828 A1    May 2, 2024

(51) Int. Cl.
*F02B 75/22* (2006.01)
*F01N 13/10* (2010.01)
*F01N 3/28* (2006.01)
*F02B 75/18* (2006.01)

(52) U.S. Cl.
CPC ............. *F02B 75/22* (2013.01); *F01N 13/10* (2013.01); *F01N 3/28* (2013.01); *F02B 2075/1808* (2013.01)

(58) Field of Classification Search
CPC .. F02B 2075/1808; F02B 25/28; F02B 75/22; F02B 75/228; F02B 77/11; F01N 1/006; F01N 13/10; F01N 13/28
See application file for complete search history.

(56) References Cited

U.S. PATENT DOCUMENTS

| | | | |
|---|---|---|---|
| 8,668,538 B1 * | 3/2014 | Langenfeld | B63H 21/34 440/89 H |
| 9,120,549 B2 * | 9/2015 | Ochiai | F01N 13/004 |
| 10,012,128 B2 | 7/2018 | Nakayama | |
| 2010/0186381 A1 * | 7/2010 | Charles | F01N 3/025 60/311 |

FOREIGN PATENT DOCUMENTS

| | | |
|---|---|---|
| JP | S5195672 U | 7/1976 |
| JP | 2006226187 A | 8/2006 |
| JP | 2011126392 A | 6/2011 |
| JP | 2016173071 A | 9/2016 |
| JP | 2018141412 A | 9/2018 |

OTHER PUBLICATIONS

Written Opinion of the International Searching Authority for PCT application PCT/JP2021/009505 mailed mailed May 5, 2021; 5 pp.

* cited by examiner

*Primary Examiner* — Syed O Hasan
(74) *Attorney, Agent, or Firm* — Armstrong Teasdale LLP (57) ABSTRACT

A V-type engine includes an engine body including a crankcase configured to rotatably support a crankshaft, and a first and second cylinder banks extending from the crankcase, an exhaust collecting pipe connected to the first and second cylinder banks, a catalyst accommodated in the exhaust collecting pipe, and a muffler detachably connected to the exhaust collecting pipe, wherein when viewed in an axial direction of the crankshaft, the catalyst is arranged within an area between axial lines of the first and second cylinder banks.

9 Claims, 9 Drawing Sheets

V-TYPE ENGINE AND WORK MACHINE

CROSS-REFERENCE TO RELATED APPLICATION

This application is a U.S. national stage application of PCT/JP2021/009505, filed on Mar. 10, 2021, which is hereby expressly incorporated by reference in its entirety.

TECHNICAL FIELD

The present invention relates to a V-type engine and a work machine.

BACKGROUND ART

Conventionally, an engine is provided with an exhaust device for discharging an exhaust gas generated in a combustion process. The exhaust device includes an exhaust pipe through which the exhaust gas passes, a catalyst configured to purify the exhaust gas, a muffler configured to reduce an exhaust sound, and the like. For example, the exhaust gas generated in the combustion process passes through the exhaust pipe, the catalyst, and the muffler in this order, and is discharged outside the engine.

For example, Patent Document 1 discloses an exhaust purifying device for a V-type engine. The exhaust purifying device includes a front exhaust passage connected to a front bank, a rear exhaust passage connected to a rear bank, a primary exhaust passage connected to the front exhaust passage and the rear exhaust passage, a catalytic converter provided in the primary exhaust passage, and a catalyst provided in the catalytic converter.

PRIOR ART DOCUMENT(S)

Patent Document(s)

Patent Document 1: JP2006-226187A

SUMMARY OF THE INVENTION

Task to be Accomplished by the Invention

However, in Patent Document 1, the catalytic converter is away from the front bank and the rear bank. Accordingly, the V-type engine including the exhaust purifying device becomes larger. Further, in the exhaust purifying device as described above, a muffler may be fixed to the primary exhaust passage by welding or the like. However, adopting such a configuration reduces the flexibility for setting the muffler.] In view of the above background, an object of the present invention is to improve the flexibility for setting a muffler and make a V-type engine compact.

Means to Accomplish the Task

To achieve such an object, one aspect of the present invention provides a V-type engine (1), comprising: an engine body (3) including a crankcase (7) configured to rotatably support a crankshaft (11), and a first and second cylinder banks (8, 9) extending from the crankcase; an exhaust collecting pipe (31) connected to the first and second cylinder banks; a catalyst (32a, 32b) accommodated in the exhaust collecting pipe; and a muffler (33) detachably connected to the exhaust collecting pipe, wherein when viewed in an axial direction of the crankshaft, the catalyst is arranged within an area (Z) between axial lines (L1, L2) of the first and second cylinder banks.

According to this aspect, the muffler is detachably connected to the exhaust collecting pipe, so that the user can set an appropriate muffler according to the configuration and the like of a work machine in which the V-type engine is installed. Accordingly, the flexibility for setting the muffler can be improved.

Further, when viewed in the axial direction of the crankshaft, the catalyst is arranged within the area between the axial lines of the first and second cylinder banks. Accordingly, the engine body and the catalyst are arranged compactly, so that the V-type engine can be made compact.

In the above aspect, preferably, the exhaust collecting pipe includes: a first exhaust pipe (41) extending inward in a width direction of the engine body from the first cylinder bank; a second exhaust pipe (42) extending inward in the width direction of the engine body from the second cylinder bank; and a merging pipe (43) connected to the first and second exhaust pipes at a center in the width direction of the engine body, and the catalyst is accommodated in the merging pipe.

According to this aspect, the configuration of the exhaust collecting pipe is simplified, so that the manufacturing cost of the V-type engine can be kept low.

In the above aspect, preferably, the merging pipe includes: an inlet pipe (51) connected to a merging portion (M) of the first and second exhaust pipes at the center in the width direction of the engine body, at least a portion of the inlet pipe extending in a height direction of the engine body; and an accommodating pipe (52, 53) connected to the inlet pipe and extending in the axial direction of the crankshaft, and the catalyst is accommodated in the accommodating pipe.

According to this aspect, the first and second exhaust pipes are merged and then connected to the accommodating pipe, so that the connecting structure between the first and second exhaust pipes and the accommodating pipe can be simplified.

In the above aspect, preferably, the merging pipe includes an accommodating pipe (52, 53) extending in the axial direction of the crankshaft, the accommodating pipe is directly connected to each of the first and second exhaust pipes, and the catalyst is accommodated in the accommodating pipe.

According to this aspect, the first and second exhaust pipes are merged at the accommodating pipe, so that a pressure drop can be reduced and the decrease in the output of the V-type engine can be suppressed as compared with a case where the first and second exhaust pipes are merged at an upstream side of the accommodating pipe.

In the above aspect, preferably, at least a portion of the first and second exhaust pipes is composed of a pipe having a divided structure.

According to this aspect, the flexibility of the shape of the first and second exhaust pipes is improved, so that the volume of the first and second exhaust pipes can be increased. Accordingly, the expansion of the exhaust gas in the first and second exhaust pipes is promoted, so that the temperature of the exhaust gas can be adjusted to the optimal temperature for the catalyst.

In the above aspect, preferably, the V-type engine further comprises an air cleaner (4) connected to the first and second cylinder banks, wherein when viewed in a width direction of the engine body, the muffler is arranged on an opposite side of the air cleaner with the first and second cylinder banks in between.

According to this aspect, the muffler is arranged sufficiently away from the air cleaner. Accordingly, it is possible to prevent the temperature around the air cleaner from rising due to the exhaust gas discharged from the muffler. Accordingly, the intake air temperature of the V-type engine can be lowered, so that the output of the V-type engine can be improved.

In the above aspect, preferably, the muffler includes a muffler body (94) having a muffling chamber (111 to 113), and the muffler body extends in a width direction of the engine body from a distal end side of the first cylinder bank to a distal end side of the second cylinder bank.

According to this aspect, it is possible to sufficiently secure the length of the muffler body without protruding the muffler body greatly with respect to the engine body. Accordingly, the volume of the muffler body is increased, so that the muffling performance can be enhanced.

In the above aspect, preferably, a plurality of catalysts is arranged in the area, and the plurality of catalysts is arranged at a center in a width direction of the engine body and aligned in a height direction of the engine body.

According to this aspect, the plurality of catalysts are arranged, so that the purifying performance of the exhaust gas can be enhanced. Further, the plurality of catalysts is arranged at the center in the width direction of the engine body. Accordingly, it is possible to prevent the gap between the plurality of catalysts and the first and second cylinder banks from becoming too narrow.

In the above aspect, preferably, an output portion (12) of the crankshaft protrudes from a lower surface of the crankcase, and the catalyst is arranged higher than the lower surface of the crankcase.

According to this aspect, in a vertical V-type engine, it is possible to prevent the catalyst from protruding lower than the lower surface of the crankcase. Accordingly, in a case where an engine mount is arranged below the crankcase, the interference between the catalyst and the engine mount can be suppressed.

To achieve such an object, another aspect of the present invention provides a work machine (P) comprising the V-type engine.

According to this aspect, it is possible to improve the flexibility for setting a muffler and make a work machine compact.

Effect of the Invention

Thus, according to the above aspects, it is possible to improve the flexibility for setting a muffler and make a V-type engine compact.

MODE(S) FOR CARRYING OUT THE INVENTION

First Embodiment

<V-Type Engine 1>

Figure 1:
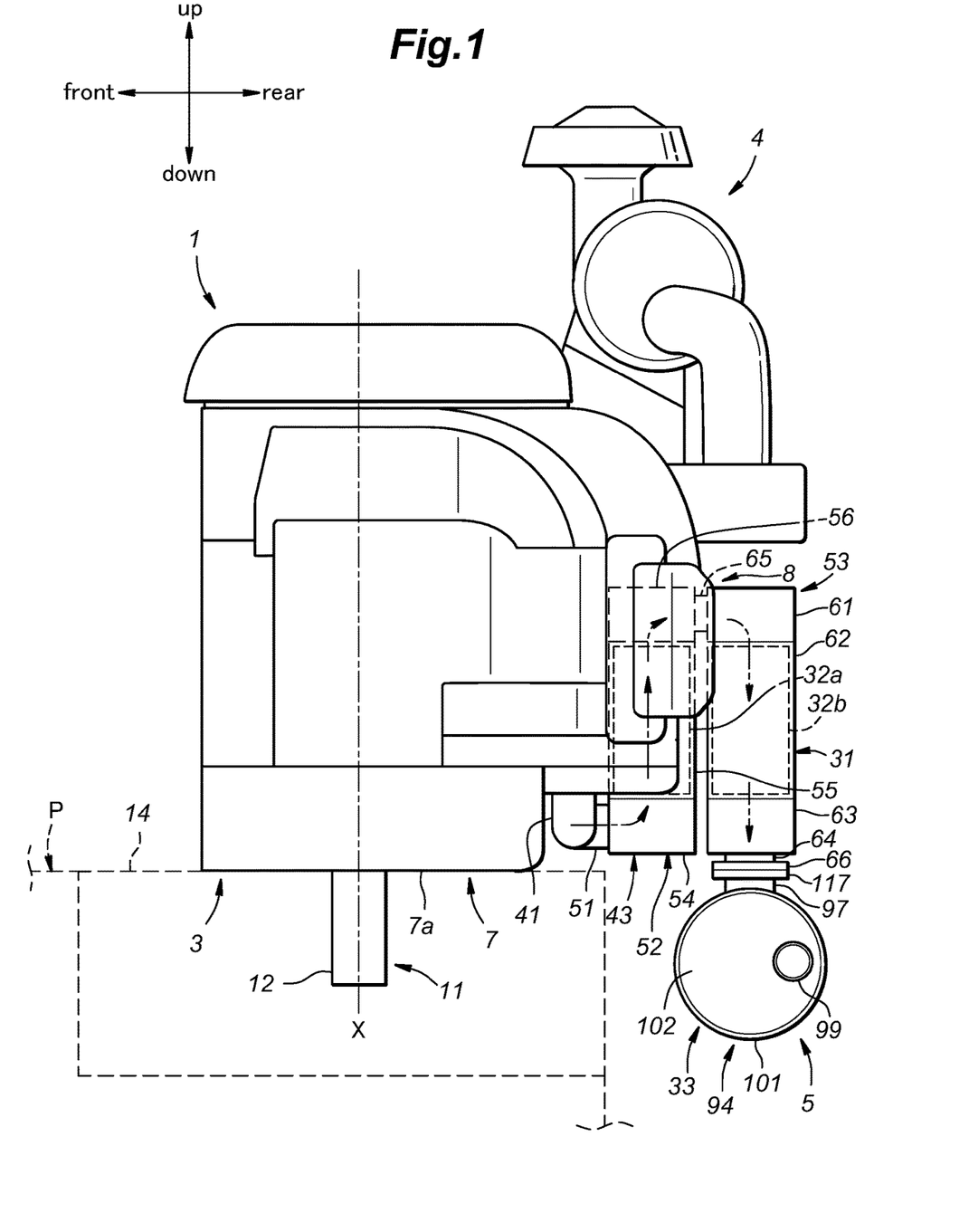
FIG. 1 is a side view showing a V-type engine according to a first embodiment of the present invention.

In the following, a V-type engine 1 (hereinafter abbreviated as "engine 1") as an internal combustion engine according to a first embodiment of the present invention will be described with reference to FIGS. 1 to 4. Hereinafter, for convenience of explanation, a left side in FIG. 1 is defined as a front side of the engine 1. Further, in this specification, when an expression like "fixed by bolt(s) (not shown)" is used, a member may be fixed by normal bolt(s) having a screw on only one side or by stud bolt(s) having screws on both sides.

With reference to FIG. 1, the engine 1 consists of a general-purpose engine used as a power source of a work machine P. For example, the work machine P consists of a riding-type lawn mower. The engine 1 consists of an OHV air-cooled engine including two cylinders. In another embodiment, the engine 1 may consist of an engine (for example, an OHC engine) other than an OHV engine, an engine (for example, a water-cooled engine) other than an air-cooled engine, or an engine including three or more cylinders.

Figure 2:
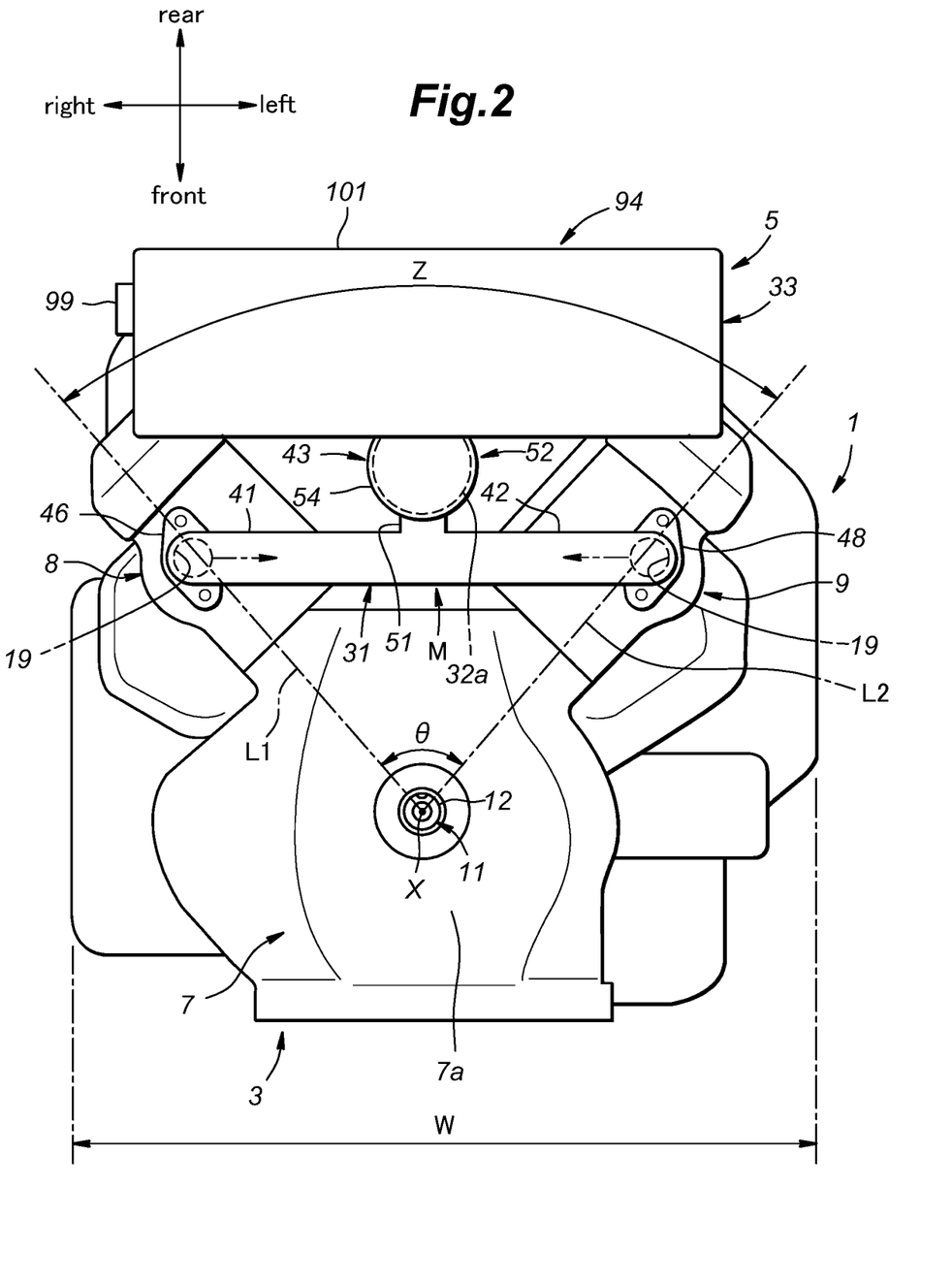
FIG. 2 is a bottom view showing the V-type engine according to the first embodiment of the present invention.

With reference to FIGS. 1 and 2, the engine 1 includes an engine body 3, an air cleaner 4 arranged above the engine body 3, and an exhaust device 5 arranged on a lower rear side of the engine body 3. In the following, these components of the engine 1 will be described in order.

<Engine Body 3>

With reference to FIGS. 1 and 2, the engine body 3 includes a crankcase 7, a first cylinder bank 8 extending to a right rear side from the crankcase 7, and a second cylinder bank 9 extending to a left rear side from the crankcase 7.

With reference to FIG. 1, an engine mount 14 is arranged below the crankcase 7. The crankcase 7 is attached to a main body of the work machine P via the engine mount 14.

With reference to FIGS. 1 and 2, a crankshaft 11 is rotatably supported by a central portion of the crankcase 7. The crankshaft 11 is configured to rotate around a rotation axis X extending in the up-and-down direction. That is, the engine 1 consists of a vertical engine in which the rotation axis X of the crankshaft 11 extends in the up-and-down direction. In another embodiment, the engine 1 may consist of a horizontal engine in which the rotation axis X of the crankshaft 11 extends in the horizontal direction. In this case, for example, the work machine P consists of a cutting machine such as a concrete cutter, a floor treatment machine such as a floor leveler, a high-pressure washer, a generator, or the like. A power take-off shaft 12 (PTO shaft: an example of an output portion) is provided at a lower end of the crankshaft 11. The PTO shaft 12 is connected to a work unit of the work machine P (for example, a blade of the riding-type lawn mower), and the work unit of the work machine P is configured to rotate according to the rotation of the PTO shaft 12. The PTO shaft 12 protrudes downward from a lower surface 7a of the crankcase 7 and extends in the up-and-down direction.

With reference to FIG. 2, the first and second cylinder banks 8, 9 are aligned in the lateral direction (the width direction of the engine body 3). Each of the first and second cylinder banks 8, 9, is provided diagonally behind the crankcase 7.

In a front portion (cylinder) of each of the first and second cylinder banks 8, 9, a piston (not shown) is accommodated so as to reciprocate. The piston is connected to the crankshaft 11 via a connecting rod (not shown).

A rear portion (cylinder head) of each of the first and second cylinder banks 8, 9 defines a combustion chamber (not shown) together with the piston. On a laterally inner surface of the rear portion of each of the first and second cylinder banks 8, 9, an intake port (not shown) communicating with the combustion chamber opens. On a lower surface of the rear portion of each of the first and second cylinder banks 8, 9, an exhaust port 19 communicating with the combustion chamber opens.

<Air Cleaner 4>

With reference to FIG. 1, the air cleaner 4 has a cylindrical shape (canister-like shape) extending in the lateral direction. The air cleaner 4 is arranged higher than the first and second cylinder banks 8, 9. The air cleaner 4 is connected to the intake ports (not shown) of the first and second cylinder banks 8, 9 via an intake pipe (not shown), and the air cleaned by the air cleaner 4 is introduced into the combustion chamber (not shown) via the intake ports.

<Exhaust Device 5>

The exhaust device 5 is a device configured to discharge the exhaust gas discharged from the engine body 3 to an outside of the engine 1. Hereinafter, an expression "upstream" and an expression "downstream" indicate "upstream" and "downstream" in an exhaust direction (namely, a direction in which the exhaust gas flows inside the exhaust device 5), respectively. One-dot chain line arrows appropriately attached to each figure indicate the exhaust direction. Hereinafter, the description "extends in the lateral direction from the rear end side (distal end side) of the first cylinder bank 8 to the rear end side (distal end side) of the second cylinder bank 9" means that a component of the exhaust device 5 extends in the lateral direction at least from the rear end side (distal end side) of the first cylinder bank 8 to the rear end side (distal end side) of the second cylinder bank 9, and does not preclude the above-mentioned component from having a length longer than the above-mentioned layout.

With reference to FIGS. 1 and 2, the exhaust device 5 includes an exhaust collecting pipe 31, first and second catalysts 32a, 32b, and a muffler 33. Hereinafter, the components of the exhaust device 5 will be described in order.

<Exhaust Collecting Pipe 31>

With reference to FIG. 2, the exhaust collecting pipe 31 of the exhaust device 5 is arranged within a width W of the engine body 3 when viewed in the up-and-down direction. The exhaust collecting pipe 31 includes a first exhaust pipe 41, a second exhaust pipe 42, and a merging pipe 43.

The first exhaust pipe 41 of the exhaust collecting pipe 31 extends leftward (inward in the width direction of the engine body 3) from the first cylinder bank 8. A first fixed flange 46 is provided on an outer circumference of a right end (upstream end) of the first exhaust pipe 41. The first fixed flange 46 is fixed around the exhaust port 19 of the first cylinder bank 8 by a pair of bolts (not shown). Thus, the right end of the first exhaust pipe 41 is connected to the exhaust port 19 of the first cylinder bank 8.

The second exhaust pipe 42 of the exhaust collecting pipe 31 extends rightward (inward in the width direction of the engine body 3) from the second cylinder bank 9. A second fixed flange 48 is provided on an outer circumference of a left end (upstream end) of the second exhaust pipe 42. The second fixed flange 48 is fixed around the exhaust port 19 of the second cylinder bank 9 by a pair of bolts (not shown). Thus, the left end of the second exhaust pipe 42 is connected to the exhaust port 19 of the second cylinder bank 9. A right end (downstream end) of the second exhaust pipe 42 merges with a left end (downstream end) of the first exhaust pipe 41 at a merging portion M arranged at the center in the lateral direction (the center in the width direction) of the engine body 3.

Figure 3:
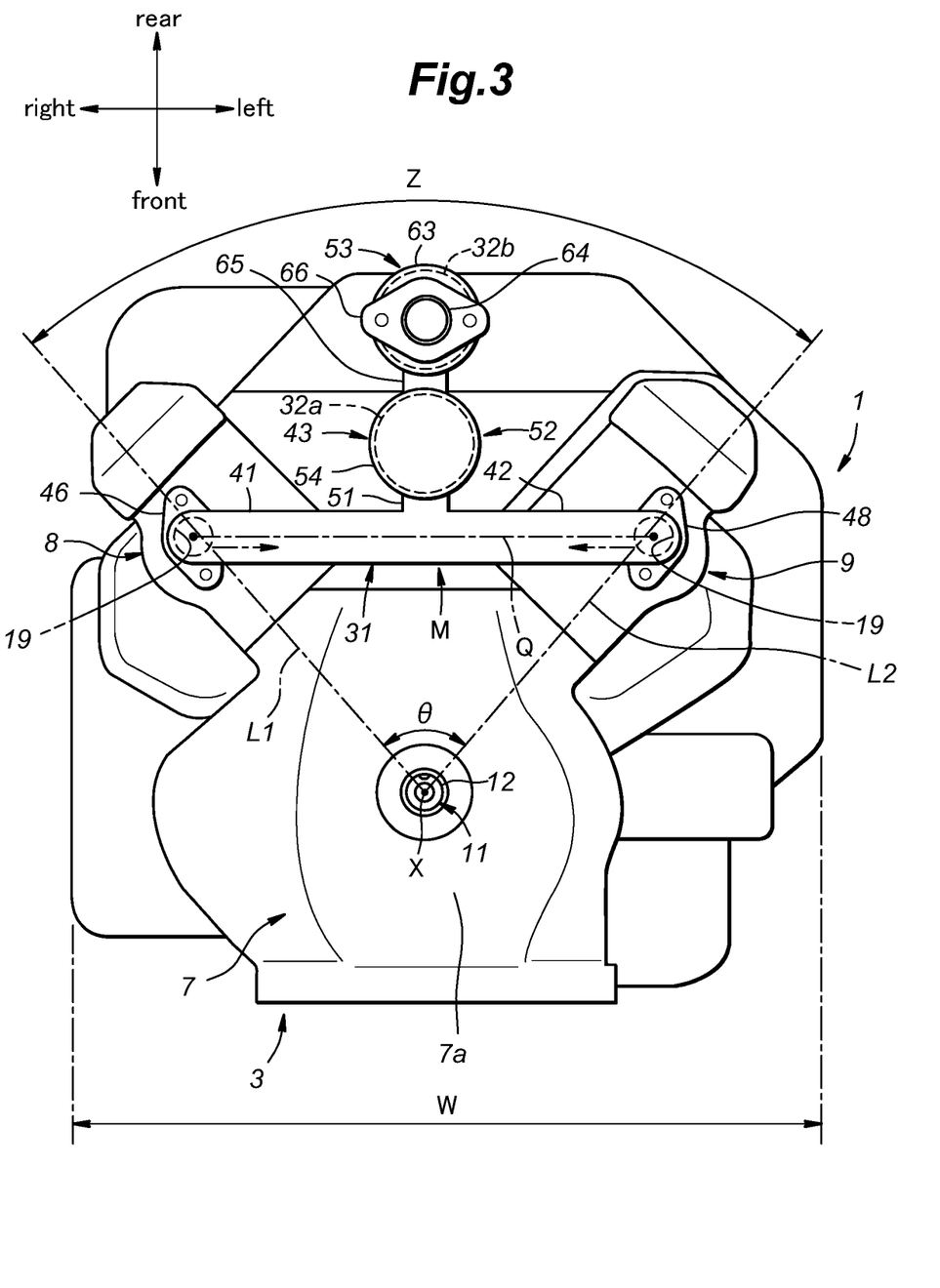
FIG. 3 is a bottom view showing the V-type engine from which a muffler is removed according to the first embodiment of the present invention.

With reference to FIG. 3, when viewed in the up-and-down direction (the axial direction of the crankshaft 11), the merging pipe 43 of the exhaust collecting pipe 31 is arranged within an area Z (hereinafter referred to as "an area Z between banks") between an axial line L1 of the first cylinder bank 8 and an axial line L2 of the second cylinder bank 9. The area Z between banks corresponds to a bank angle θ between the first and second cylinder banks 8, 9.

The merging pipe 43 includes an inlet pipe 51, and first and second accommodating pipes 52, 53.

The inlet pipe 51 of the merging pipe 43 is provided integrally with the first and second exhaust pipes 41, 42. The inlet pipe 51 extends in the front-and-rear direction (height direction of the engine body 3). "The height direction of the engine body 3" is, for example, a direction perpendicular to both the width direction of the engine body 3 (the direction in which the first and second cylinder banks 8, 9 are aligned) and the axial direction of the crankshaft 11, and does not necessarily match the up-and-down direction in the actual space. "The height direction of the engine body 3" is, for example, a direction perpendicular to a straight line Q connecting the exhaust ports 19 of the first and second cylinder banks 8, 9. The front end (upstream end) of the inlet pipe 51 is connected to the merging portion M of the first and second exhaust pipes 41, 42 at the center in the lateral direction of the engine body 3.

With reference to FIGS. 1 and 3, the first and second accommodating pipes 52, 53 of the merging pipe 43 are arranged at the center in the lateral direction of the engine body 3, and aligned in the front-and-rear direction. More specifically, the second accommodating pipe 53 is arranged at a rear side of the first accommodating pipe 52. The first and the second accommodating pipes 52, 53 extend in the up-and-down direction.

The first accommodating pipe 52 includes an upstream portion 54, a main body portion 55 arranged above the upstream portion 54, a downstream portion 56 arranged above the main body portion 55. The upstream portion 54 and the main body portion 55, and the main body portion 55 and the downstream portion 56 are fixed by welding, respectively. The upstream portion 54 is connected to a rear end (downstream end) of the inlet pipe 51 at the center in the lateral direction of the engine body 3.

The second accommodating pipe 53 includes an upstream portion 61, a main body portion 62 arranged below the upstream portion 61, a downstream portion 63 arranged below the main body portion 62, and a connecting portion 64 protruding downward from the downstream portion 63. The upstream portion 61 and the main body portion 62, the main body portion 62 and the downstream portion 63, and the downstream portion 63 and the connecting portion 64 are fixed by welding, respectively. The upstream portion 61 is connected to the downstream portion 56 of the first accommodating pipe 52 via a coupling pipe 65 extending in the front-and-rear direction. A connecting flange 66 is provided at a lower end (downstream end) of the connecting portion 64.

<First and Second Catalysts 32a, 32b>

As shown in FIGS. 1 and 3, the first and second catalysts 32a, 32b of the exhaust device 5 consist of a ternary catalyst, for example. The first and second catalysts 32a, 32b are configured to purify the exhaust gas by changing a harmful substance in the exhaust gas, which is discharged from the engine body 3 via the exhaust collecting pipe 31, into a harmless substance by a chemical reaction.

The first and second catalysts 32a, 32b have a columnar shape elongated in the up-and-down direction. That is, in the present embodiment, the longitudinal direction of the first and second catalysts 32a, 32b is the up-and-down direction. Upper ends of the first and second catalysts 32a, 32b are arranged lower than upper ends of the first and second cylinder banks 8, 9. Lower ends of the first and second catalysts 32a, 32b are arranged higher than the lower surface 7a of the crankcase 7.

The first and second catalysts 32a, 32b are arranged at the center in the lateral direction of the engine body 3, and aligned in the front-and-rear direction. More specifically, the second catalyst 32b is arranged at a rear side of the first catalyst 32a. When viewed in the up-and-down direction, the first and second catalysts 32a, 32b are arranged within the area Z between banks. The first catalyst 32a is accommodated in the first accommodating pipe 52 (more specifically, the main body portion 55 of the first accommodating pipe 52) of the merging pipe 43 of the exhaust collecting pipe 31, and arranged in a space between the first and second cylinder banks 8, 9. The second catalyst 32b is accommodated in the second accommodating pipe 53 (more specifically, the main body portion 62 of the second accommodating pipe 53) of the merging pipe 43 of the exhaust collecting pipe 31, and is arranged a little more rearward than the space between the first and second cylinder banks 8, 9.

<Muffler 33>

Figure 4:
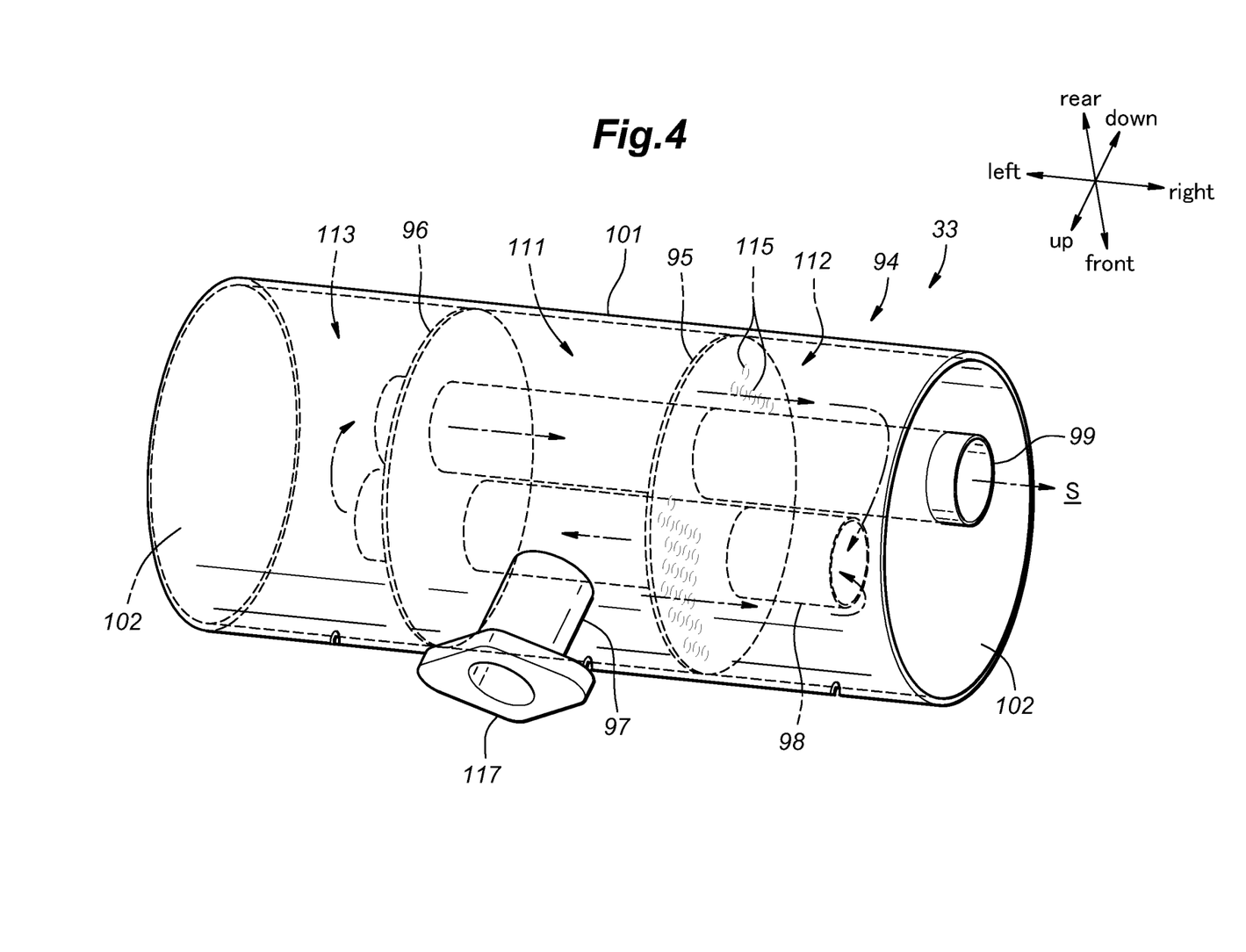
FIG. 4 is a perspective view showing the muffler according to the first embodiment of the present invention.

With reference to FIG. 1, when viewed in the lateral direction, the muffler 33 of the exhaust device 5 is arranged on an opposite side of the air cleaner 4 with the first and second cylinder banks 8, 9 in between. With reference to FIG. 2, the muffler 33 is arranged on a downstream side of the exhaust collecting pipe 31. The muffler 33 is not welded to the exhaust collecting pipe 31, and is detachably connected to the second accommodating pipe 53 of the merging pipe 43 of the exhaust collecting pipe 31 at the center in the lateral direction of the engine body 3. With reference to FIG. 4, the muffler 33 includes a muffler body 94, a plurality of partition walls 95, 96, an inflow pipe 97, a communication pipe 98, and a discharge pipe 99.

With reference to FIGS. 1 and 2, the muffler body 94 is arranged adjacently to the second accommodating pipe 53 of the merging pipe 43 on a lower side of the second accommodating pipe 53 of the merging pipe 43. The muffler body 94 protrudes lower than the lower surface 7a of the crankcase 7.

The muffler body 94 extends in the lateral direction from the rear end side (distal end side) of the first cylinder bank 8 to the rear end side (distal end side) of the second cylinder bank 9. The left and right side portions of the muffler body 94 overlap with rear portions of the first and second cylinder banks 8, 9 when viewed in the up-and-down direction. The muffler body 94 is arranged within the width W of the engine body 3 when viewed in the up-and-down direction.

The muffler body 94 has a cylindrical shape elongated in the lateral direction. That is, in the present embodiment, the longitudinal direction of the muffler body 94 is the lateral direction. In another embodiment, the muffler body 94 may have a shape (for example, a polygonal tubular shape) other than a cylindrical shape.

With reference to FIG. 4, the muffler body 94 includes a tubular portion 101 extending in the lateral direction, and a pair of lid portions 102 covering openings at both ends of the tubular portion 101. An outer circumferential surface of the tubular portion 101 may be fixed to the crankcase 7 and/or the first and second cylinder banks 8, 9, or may be fixed to the main body of the work machine P.

A plurality of muffling chambers 111 to 113 is formed inside the muffler body 94. The plurality of muffling chambers 111 to 113 include a first muffling chamber 111 formed at the center in the lateral direction of the muffler body 94, a second muffling chamber 112 formed at a right end of the muffler body 94, and a third muffling chamber 113 formed at a left end of the muffler body 94.

The plurality of partition walls 95, 96 include a first partition wall 95 laterally partitioning the first muffling chamber 111 and the second muffling chamber 112, and a second partition wall 96 laterally partitioning the first muffling chamber 111 and the third muffling chamber 113. The first partition wall 95 is provided with multiple small holes 115 over the entire area thereof, and the first muffling chamber 111 and the second muffling chamber 112 communicate with each other via these multiple small holes 115.

With reference to FIGS. 1 and 4, the inflow pipe 97 is arranged above the muffler body 94. The inflow pipe 97 extends in the up-and-down direction. A connecting flange 117 is provided at an upper end (upstream end) of the inflow pipe 97. The connecting flange 117 is fixed to the connecting flange 66 of the second accommodating pipe 53 of the merging pipe 43 with a pair of bolts (not shown). A lower end (downstream end) of the inflow pipe 97 is fixed to the tubular portion 101 of the muffler body 94, and thereby connected to the first muffling chamber 111 of the muffler body 94.

With reference to FIG. 4, the communication pipe 98 extends in the lateral direction. The communication pipe 98 penetrates the first and second partition walls 95, 96 to be supported by the first and second partition walls 95, 96. A right end (upstream end) of the communication pipe 98 communicates with the second muffling chamber 112, and a left end (downstream end) of the communication pipe 98 communicates with the third muffling chamber 113. According to the above configuration, the second muffling chamber 112 and the third muffling chamber 113 communicate with each other via the communication pipe 98.

The discharge pipe 99 extends in the lateral direction. The discharge pipe 99 penetrates the lid portion 102 at a right side of the muffler body 94 and the first and second partition walls 95, 96 to be supported by the lid portion 102 at the right side of the muffler body 94 and the first and second partition walls 95, 96. A left end (upstream end) of the discharge pipe 99 communicates with the third muffling chamber 113, and a right end (downstream end) of the discharge pipe 99 communicates with an external space S on the right side of the muffler body 94. According to the above configuration, the third muffling chamber 113 and the external space S on the right side of the muffler body 94 communicate with each other via the discharge pipe 99. In another embodiment, the third muffling chamber 113 and an external space on a left side of the muffler body 94 may communicate with each other via the discharge pipe 99.

<Flow of the Exhaust Gas>

With reference to FIGS. 1 and 2, when the engine 1 is driven, the exhaust gas is discharged from the exhaust ports 19 of the first and second cylinder banks 8, 9. The exhaust gas discharged from the exhaust ports 19 passes through the first and second exhaust pipes 41, 42. Thereafter, the exhaust gas passes through the inlet pipe 51, the first accommodating pipe 52, and the second accommodating pipe 53 of the merging pipe 43 in this order, and then is discharged from the second accommodating pipe 53 of the merging pipe 43. As described above, the exhaust gas passes through the first and second accommodating pipes 52, 53 of the merging pipe 43. Thus, the exhaust gas is purified by the first and second catalysts 32*a*, 32*b* accommodated in the first and second accommodating pipes 52, 53 of the merging pipe 43.

With reference to FIG. 4, the exhaust gas discharged from the second accommodating pipe 53 of the merging pipe 43 flows into the inflow pipe 97 of the muffler 33. The exhaust gas that has flowed into the inflow pipe 97 passes through the inflow pipe 97, and then flows into the first muffling chamber 111 of the muffler 33. The exhaust gas that has flowed into the first muffling chamber 111 passes through the first muffling chamber 111, and then flows into the second muffling chamber 112 of the muffler 33 through the multiple small holes 115 of the first partition wall 95. The exhaust gas that has flowed into the second muffling chamber 112 passes through the second muffling chamber 112, and then flows into the third muffling chamber 113 of the muffler 33 via the communication pipe 98 of the muffler 33. The exhaust gas that has flowed into the third muffling chamber 113 passes through the third muffling chamber 113, and then is discharged to the external space S on the right side of the muffler body 94 via the discharge pipe 99 of the muffler 33. In this way, the exhaust gas passes through the muffler 33, and thus the exhaust sound is reduced.

<The Effect of the First Embodiment>

In the present embodiment, the muffler 33 is detachably connected to the second accommodating pipe 53 of the merging pipe 43 of the exhaust collecting pipe 31. By adopting such a configuration, the user can appropriately set the muffler 33 according to the configuration and the like of the work machine P in which the engine 1 is installed. Accordingly, the flexibility for setting the muffler 33 can be improved.

Further, when viewed in the up-and-down direction, the first and second catalysts 32*a*, 32*b* are arranged within the area Z between banks. Accordingly, the engine body 3 and the first and second catalysts 32*a*, 32*b* are arranged compactly, so that the engine 1 can be made compact.

The exhaust collecting pipe 31 includes the first exhaust pipe 41 extending leftward (inward in the width direction of the engine body 3) from the first cylinder bank 8, the second exhaust pipe 42 extending rightward (inward in the width direction of the engine body 3) from the second cylinder bank 9, and the merging pipe 43 connected to the first and second exhaust pipes 41, 42 at the center in the lateral direction of the engine body 3. By adopting such a configuration, the configuration of the exhaust collecting pipe 31 can be simplified, so that the manufacturing cost of the engine 1 can be kept low.

Further, the first accommodating pipe 52 of the merging pipe 43 is connected to the merging portion M of the first and second exhaust pipes 41, 42 via the inlet pipe 51 of the merging pipe 43. In this way, the first and second exhaust pipes 41, 42 are connected and then merged to the first accommodating pipe 52, so that the connecting structure between the first and second exhaust pipes 41, 42 and the first accommodating pipe 52 can be simplified.

Further, when viewed in the lateral direction, the muffler 33 is arranged on an opposite side of the air cleaner 4 with the first and second cylinder banks 8, 9 in between. In this way, the muffler 33 is arranged sufficiently away from the air cleaner 4. Accordingly, it is possible to prevent the temperature around the air cleaner 4 from rising due to the exhaust gas discharged from the muffler 33. Accordingly, the intake air temperature of the engine 1 is lowered, so that the output of the engine 1 can be improved.

Further, the muffler body 94 extends in the lateral direction from the rear end side (distal end side) of the first cylinder bank 8 to the rear end side (distal end side) of the second cylinder bank 9. By adopting such a configuration, it is possible to sufficiently ensure the length of the muffler body 94 without protruding the muffler body 94 greatly with respect to the engine body 3. Accordingly, the volume of the muffler body 94 can be increased, so that the muffling performance can be enhanced.

Further, the first and second catalysts 32*a*, 32*b* are arranged at the center in the lateral direction of the engine body 3, and aligned in the front-and-rear direction. By arranging a plurality of catalysts in this way, the purifying performance of the exhaust gas can be enhanced. Further, by arranging the first and second catalysts 32*a*, 32*b* at the center in the width direction of the engine body 3, it is possible to prevent the gap between the first and second catalysts 32*a*, 32*b* and the first and second cylinder banks 8, 9 from becoming too narrow.

Further, the first and second catalysts 32*a*, 32*b* are arranged higher than the lower surface 7*a* of the crankcase 7. By adopting such a configuration, it is possible to prevent the first and second catalysts 32*a*, 32*b* from protruding lower than the lower surface 7*a* of the crankcase 7 in the vertical type engine 1. Accordingly, the interference between the first and second catalysts 32*a*, 32*b* and the engine mount 14 can be suppressed.

<Modified Embodiment>

Figure 5:
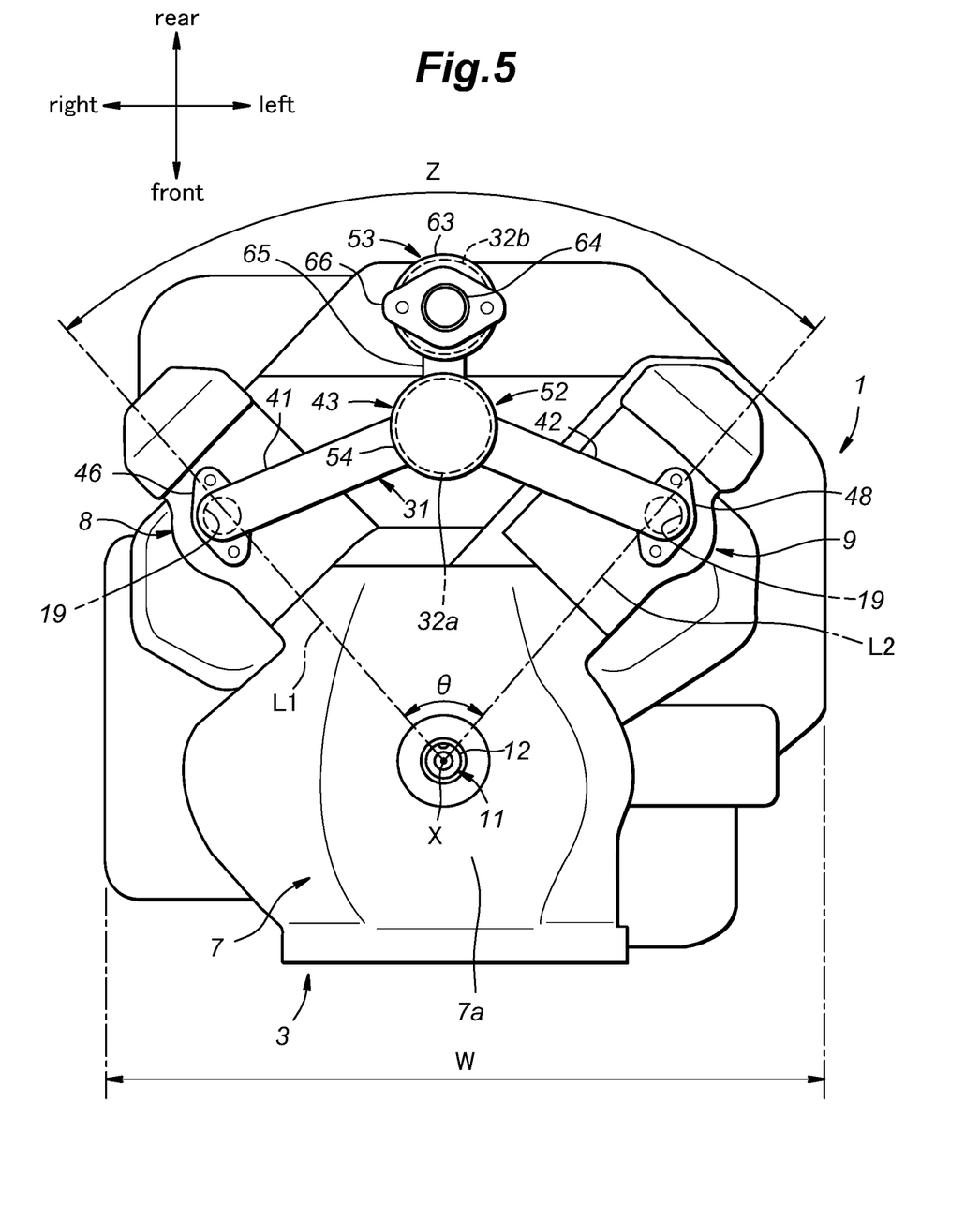
FIG. 5 is a bottom view showing a V-type engine according to another embodiment of the present invention.

In the present embodiment, the first accommodating pipe 52 of the merging pipe 43 is connected to the merging portion M of the first and second exhaust pipes 41, 42 via the inlet pipe 51 of the merging pipe 43. In another embodiment, as shown in FIG. 5, the first accommodating pipe 52 of the merging pipe 43 may be directly connected to each of the first and second exhaust pipes 41, 42. Thus, the first and second exhaust pipes 41, 42 merge at the first accommodating pipe 52, so that a pressure drop is reduced and the decrease in the output of the engine 1 can be suppressed as compared with a case where the first and second exhaust pipes 41, 42 merge on an upstream side of the first accommodating pipe 52.

Figure 6:
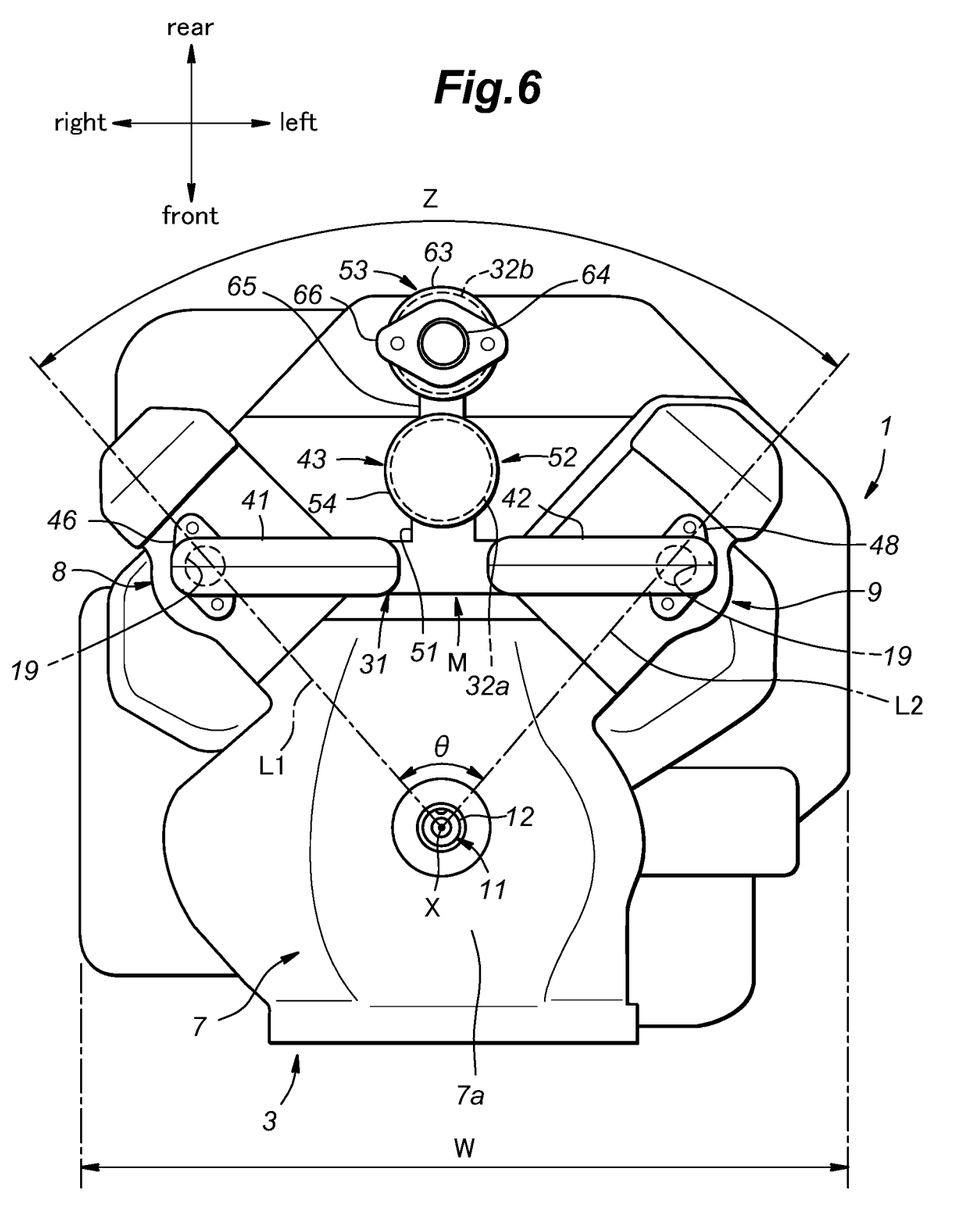
FIG. 6 is a bottom view showing a V-type engine according to still another embodiment of the present invention.

In the present embodiment, the first and second exhaust pipes 41, 42 are formed of a pipe having an undivided structure. In another embodiment, as shown in FIG. 6, at least a portion of the first and second exhaust pipes 41, 42 may be formed of a pipe having a divided structure. By adopting such a configuration, the flexibility of the shape of the first and second exhaust pipes 41, 42 is improved, so that the volumes of the first and second exhaust pipes 41, 42 can be increased. Accordingly, the expansion of the exhaust gas in the first and second exhaust pipes 41, 42 is promoted, so that the temperature of the exhaust gas can be adjusted to the optimum temperature for the first and second catalysts 32*a*, 32*b*.

Figure 7:
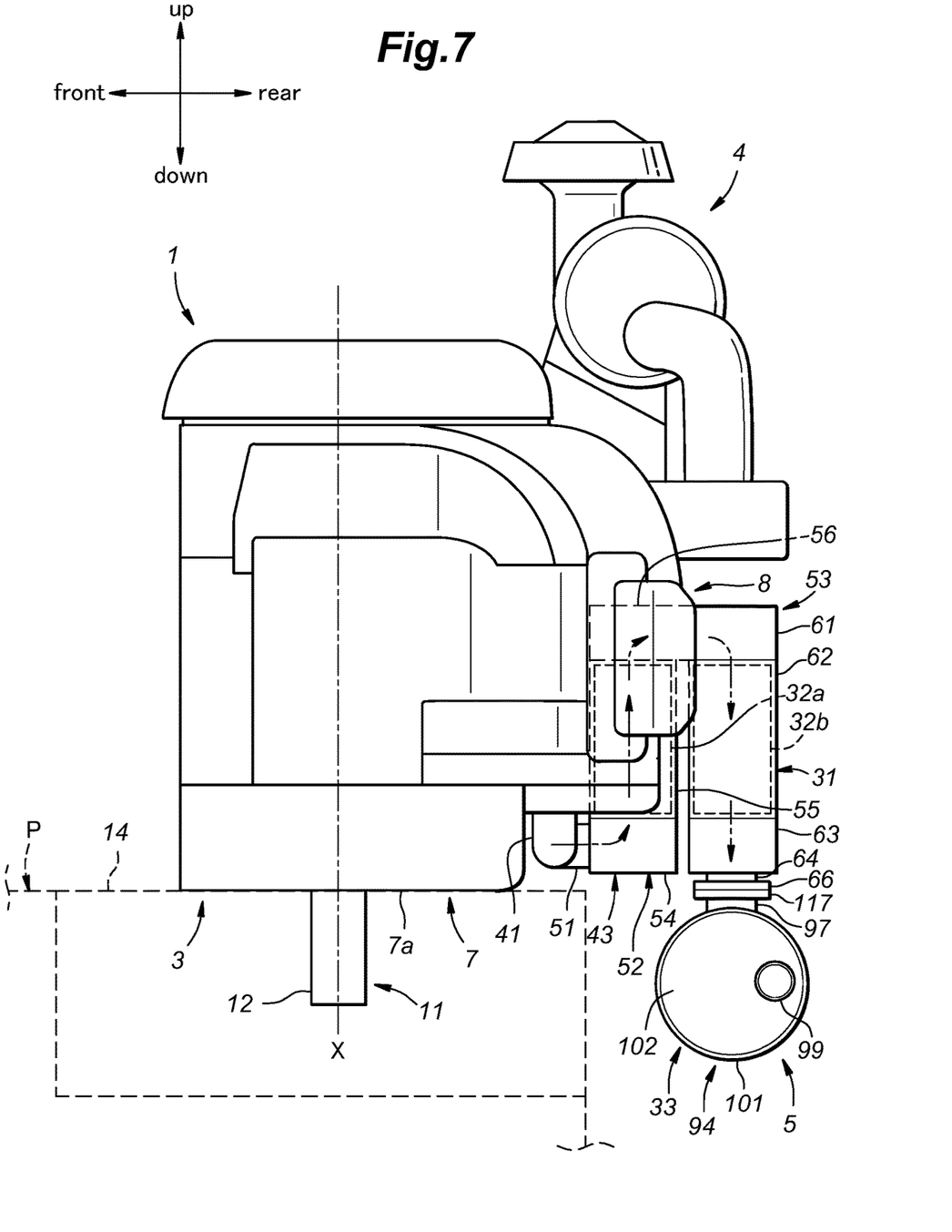
FIG. 7 is a side view showing a V-type engine according to still another embodiment of the present invention.

In the present embodiment, the downstream portion 56 of the first accommodating pipe 52 and the upstream portion 61 of the second accommodating pipe 53 are connected via the coupling pipe 65. In another embodiment, as shown in FIG. 7, the downstream portion 56 of the first accommodating pipe 52 and the upstream portion 61 of the second accommodating pipe 53 may be integrated.

<V-Type Engine 120>

Figure 8:
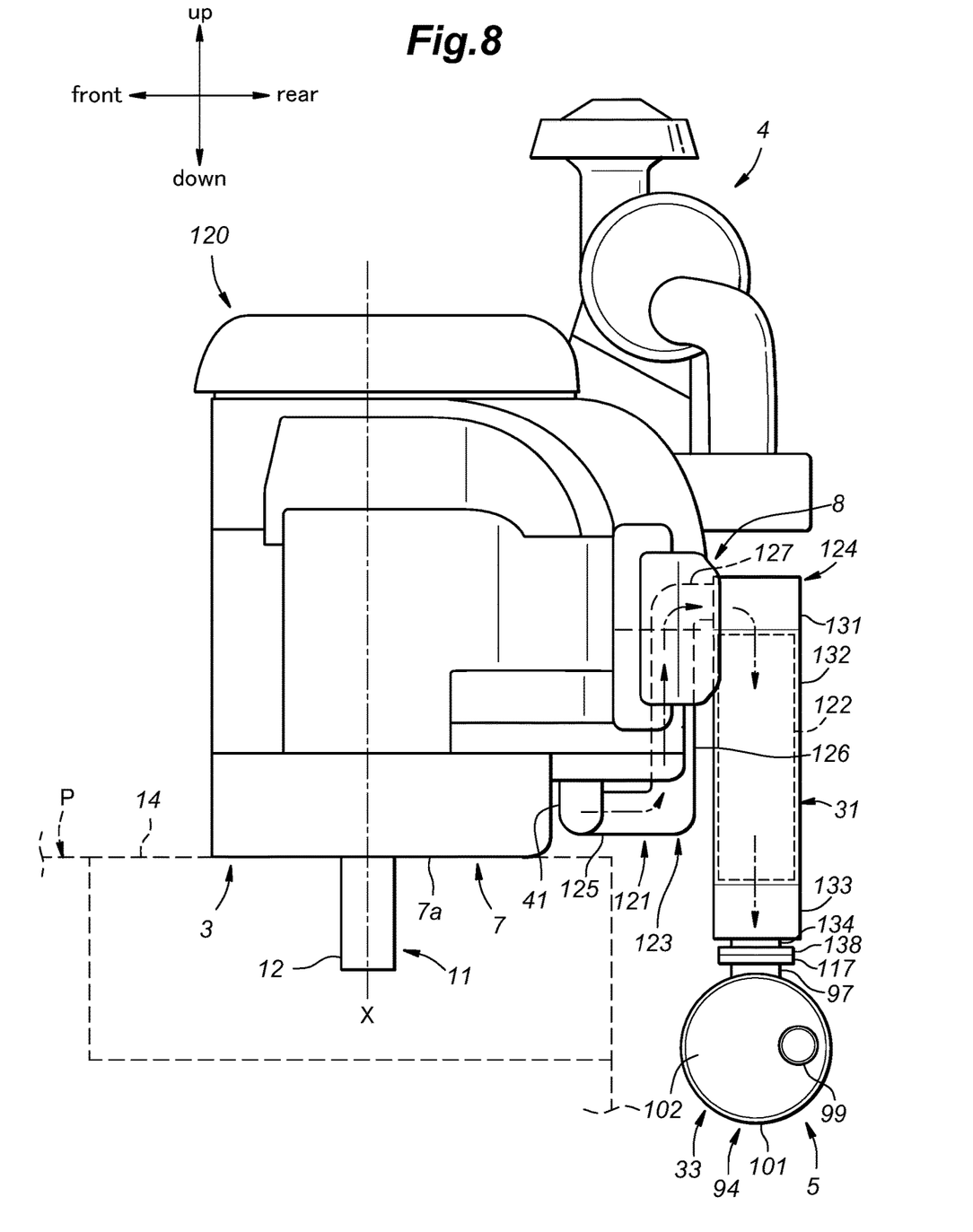
FIG. 8 is a side view showing a V-type engine according to a second embodiment of the present invention.
Figure 9:
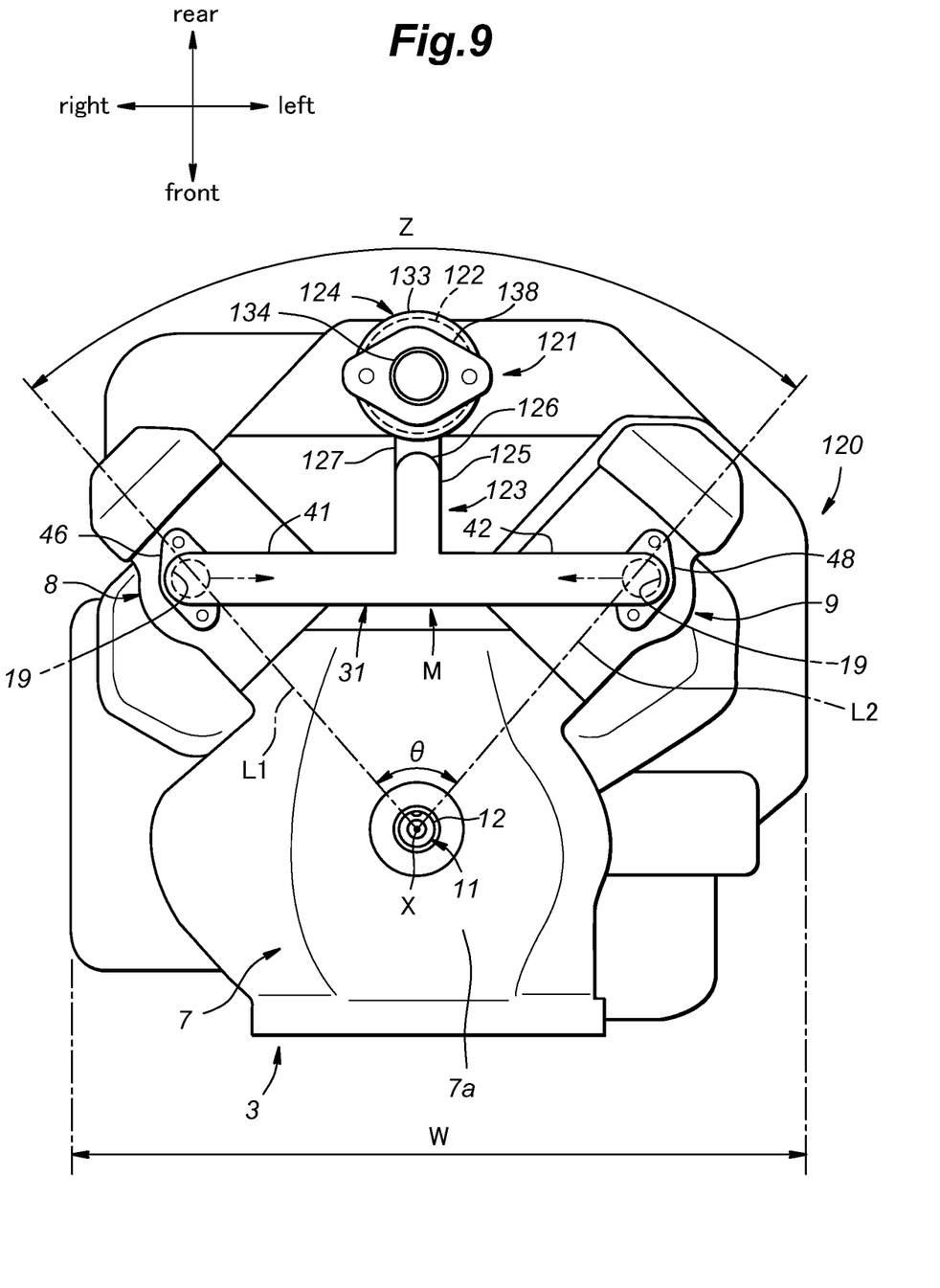
FIG. 9 is a bottom view showing the V-type engine according to the second embodiment of the present invention.

In the following, a V-type engine 120 (hereinafter abbreviated as "the engine 120") according to the second embodiment of the present invention will be described with reference to FIGS. 8 and 9. The components other than a merging pipe 121 and a catalyst 122 is the same as the first embodiment. Accordingly, these components are denoted in the drawings by the same reference numerals as those of the first embodiment, and the description thereof will be omitted. Further, the explanations of the merging pipe 121 and the catalyst 122 that overlap with the first embodiment will also be omitted as appropriate.

<Merging Pipe 121>

When viewed in the up-and-down direction, the merging pipe 121 is arranged within the area Z between banks. The merging pipe 121 includes an inlet pipe 123 and an accommodating pipe 124.

The inlet pipe 123 of the merging pipe 121 is provided integrally with the first and second exhaust pipes 41, 42. The inlet pipe 123 is composed of a first pipe 125, a second pipe 126, and a third pipe 127. The first pipe 125 extends in the front-and-rear direction. A front end (upstream end) of the first pipe 125 is connected to the merging portion M of the first and second exhaust pipes 41, 42 at the center in the lateral direction of the engine body 3. The second pipe 126 is bent upward from a rear end (downstream end) of the first pipe 125, and extends in the up-and-down direction. The third pipe 127 is bent rearward from an upper end (downstream end) of the second pipe 126, and extends in the front-and-rear direction.

The accommodating pipe 124 of the merging pipe 121 includes an upstream portion 131, a main body portion 132 arranged below the upstream portion 131, a downstream portion 133 arranged below the main body portion 132, and a connecting portion 134 protruding downward from the downstream portion 133. The upstream portion 131 and the main body portion 132, the main body portion 132 and the downstream portion 133, and the downstream portion 133 and the connecting portion 134 are fixed by welding, respectively. The upstream portion 131 is connected to a rear end (downstream end) of the third pipe 127 of the inlet pipe 123. A connecting flange 138 is provided at a lower end (downstream end) of the connecting portion 134.

<Catalyst 122>

The catalyst 122 has a cylindrical shape elongated in the up-and-down direction. That is, in the present embodiment, the longitudinal direction of the catalyst 122 is the up-and-down direction. An upper end of the catalyst 122 is arranged lower than upper ends of the first and second cylinder banks 8,9. A lower end of the catalyst 122 is arranged lower than the lower surface 7a of the crankcase 7. In another embodiment, the lower end of the catalyst 122 may be arranged higher than the lower surface 7a of the crankcase 7.

The catalyst 122 is arranged at the center in the lateral direction of the engine body 3. When viewed in the up-and-down direction, the catalyst 122 is arranged within the area Z between banks. The catalyst 122 is accommodated in the accommodating pipe 124 (more specifically, the main body portion 132 of the accommodating pipe 124) of the merging pipe 121, and is arranged a little more rearward than a space between the first and second cylinder banks 8, 9.

<The Effect of the Second Embodiment>

Like the first and second catalysts 32a, 32b of the first embodiment, the catalyst 122 is arranged within the area Z between banks when viewed in the up-and-down direction. Accordingly, the engine body 3 and the catalyst 122 are arranged compactly, and the engine 120 can be made compact.

Concrete embodiments of the present invention have been described in the foregoing, but the present invention should not be limited by the foregoing embodiments and various modifications and alterations are possible. That is, the positions, orientations, or the like of the components of the exhaust device 5 can be freely changed according to the configuration of the work machine P (for example, a generator, a welder, a lawn mower, a cultivator, or the like) on which the engine 1, 120 is mounted. Accordingly, the position and exhaust direction of the muffler 33 are also not limited by the foregoing embodiments, and can be freely set within the scope of the present invention. For example, when the work machine P provided with the engine 1, 120 is used in an orchard, the position and exhaust direction of the muffler 33 may be set such that the exhaust gas discharged from the muffler 33 does not hit against the fruit trees.

GLOSSARY OF TERMS

First Embodiment

1: a V-type engine
3: an engine body
4: an air cleaner
7: a crankcase
7a: a lower surface of the crankcase
8: a first cylinder bank
9: a second cylinder bank
11: a crankshaft
12: a PTO shaft (an example of an output portion)
31: an exhaust collecting pipe
32a: a first catalyst
32b: a second catalyst
33: a muffler
41: a first exhaust pipe
42: a second exhaust pipe
43: a merging pipe
51: an inlet pipe
52: a first accommodating pipe
53: a second accommodating pipe
94: a muffler body
111: a first muffling chamber
112: a second muffling chamber
113: a third muffling chamber
L1: an axial line of the first cylinder bank
L2: an axial line of the second cylinder bank
M: a merging portion
P: a work machine
Z: an area Second Embodiment 121: a merging pipe
122: a catalyst
123: an inlet pipe
124: an accommodating pipe

What is claimed is:

1. A V-type engine, comprising: an engine body including a crankcase configured to rotatably support a crankshaft, and a first and second cylinder banks extending from the crankcase; an exhaust collecting pipe connected to the first and second cylinder banks; a catalyst accommodated in the exhaust collecting pipe; a muffler detachably connected to the exhaust collecting pipe, wherein when viewed in an axial direction of the crankshaft, the catalyst is arranged within an area between axial lines of the first and second cylinder banks an air cleaner connected to the first and second cylinder banks, wherein when viewed in a width direction of the engine body, the muffler is arranged on an opposite side of the air cleaner with the first and second cylinder banks in between, and wherein the muffler includes a muffler body having a muffling chamber, and the muffler body extends in a width direction of the engine body from a distal end side of the first cylinder bank to a distal end side of the second cylinder bank.

2. The V-type engine according to claim 1, wherein the exhaust collecting pipe includes:
   a first exhaust pipe extending inward in a width direction of the engine body from the first cylinder bank;
   a second exhaust pipe extending inward in the width direction of the engine body from the second cylinder bank; and
   a merging pipe connected to the first and second exhaust pipes at a center in the width direction of the engine body, and
   the catalyst is accommodated in the merging pipe.

3. The V-type engine according to claim 2, wherein the merging pipe includes:
   an inlet pipe connected to a merging portion of the first and second exhaust pipes at the center in the width direction of the engine body, at least a portion of the inlet pipe extending in a height direction of the engine body; and
   an accommodating pipe connected to the inlet pipe and extending in the axial direction of the crankshaft, and the catalyst is accommodated in the accommodating pipe.

4. The V-type engine according to claim 2, wherein the merging pipe includes an accommodating pipe extending in the axial direction of the crankshaft,
   the accommodating pipe is directly connected to each of the first and second exhaust pipes, and
   the catalyst is accommodated in the accommodating pipe.

5. The V-type engine according to claim 2, wherein at least a portion of the first and second exhaust pipes is composed of a pipe having a divided structure.

6. The V-type engine according to claim 1, wherein a plurality of catalysts is arranged in the area, and
   the plurality of catalysts is arranged at a center in a width direction of the engine body and aligned in a height direction of the engine body.

7. The V-type engine according to claim 1, wherein an output portion of the crankshaft protrudes from a lower surface of the crankcase, and
   the catalyst is arranged higher than the lower surface of the crankcase.

8. A work machine comprising the V-type engine according to claim 1.

9. A V-type engine, comprising: an engine body including a crankcase configured to rotatably support a crankshaft, and a first and second cylinder banks extending from the crankcase; an exhaust collecting pipe connected to the first and second cylinder banks; a catalyst accommodated in the exhaust collecting pipe; a muffler detachably connected to the exhaust collecting pipe, wherein when viewed in an axial direction of the crankshaft, the catalyst is arranged within an area between axial lines of the first and second cylinder banks an air cleaner connected to the first and second cylinder banks, wherein when viewed in a width direction of the engine body, the muffler is arranged on an opposite side of the air cleaner with the first and second cylinder banks in between, wherein a plurality of catalysts is arranged in the area, and the plurality of catalysts is arranged at a center in a width direction of the engine body and aligned in a height direction of the engine body.

* * * * *